(12) United States Patent
Huang

(10) Patent No.: US 7,271,354 B2
(45) Date of Patent: Sep. 18, 2007

(54) BUFFERING PROTECTIVE HANDHELD CONTROLLER DEVICE

(76) Inventor: Hsien-Ta Huang, No. 63, Lane 65, Shin Kong Road, Ping Jenn City, Taoyuan (TW)

( * ) Notice: Subject to any disclaimer, the term of this patent is extended or adjusted under 35 U.S.C. 154(b) by 337 days.

(21) Appl. No.: 10/805,267

(22) Filed: Mar. 22, 2004

(65) Prior Publication Data

US 2005/0190532 A1 Sep. 1, 2005

(51) Int. Cl.
*H01H 25/04* (2006.01)
(52) U.S. Cl. .................................. 200/6 A
(58) Field of Classification Search ............. 200/4, 200/5 R, 6 A, 17 R, 18; 273/148 R; 463/36–38; 74/471 R, 473.3, 471 XY, 473.33, 473.34, 74/473.35
See application file for complete search history.

(56) References Cited

U.S. PATENT DOCUMENTS 6,998,548 B2 * 2/2006 Huang ..................... 200/6 A

* cited by examiner

*Primary Examiner*—Michael A. Friedhofer

(57) ABSTRACT

A buffering protective handheld controller, mainly with a buffering protective configuration for direction buttons and a number of functional buttons on one side of the main unit. It composes a multiple-layer cushion as a protective mechanism. Further, the handheld main unit has the rigid plastic base in an appropriate hollow shape, which may be enclosed by a sticking soft pad with a proper size. Thus, it can provide a cushion air-bag effect and fits the user's palm in any shape and any size. Particularly, because the user can hold the unit with a firm grasp by fingers, the grasping force is minimized during use. Such a handheld controller not only has the most comfortability but also reduced holding pressure. Therefore, it can provide fatigue reduction, blistering prevention and benefits like finger protection from callus and deformation.

4 Claims, 6 Drawing Sheets

BUFFERING PROTECTIVE HANDHELD CONTROLLER DEVICE

BACKGROUND OF THE INVENTION

1. Field of the Invention

The present invention is related to a handheld controller, especially a configuration that provides buffering protection to hands.

2. Description of the Related Art

Current handheld controllers use plastic material to make the touch buttons on the main unit. However, under a long period of pressing time, the rigid plastic material around the button makes the user feel discomfort due to an opposite force. Usually this results in ache, blistering, callus, or finger deformation, as the worst. Besides, because the handheld part of the main unit is made of injection molded ABS or rigid plastics, the user feels discomfort at the holding hands. Therefore, the comfortability of current handheld controller needs to be improved.

SUMMARY OF THE INVENTION

The inventor realized the need of an improved handheld controller in comfortability and invented a buffering protective handheld controller.

The main objective of the invention is to provide a handheld controller that provides buffering protection. Mainly, it provides a buffering protective configuration for direction buttons and a number of functional buttons on one side of the main unit. The user is allowed to have greater touch area and more comfortability when pressing the button. Especially, under a long period of button-pressing time, the user has finger contact with surrounding buffering devices to reduce pressure. Therefore, the invention can provide fatigue reduction, blistering prevention and benefits like finger protection from callus and deformation.

Another objective of the invention is to provide a buffering protective handheld controller which main unit has the handheld base in a hollow shape and enclosed by a sticking soft pad with a proper size. Thus, it can provide a cushion air-bag effect to fit the user's palm in any shape and any size. Particularly, because the user can hold the unit with a firm grasp by fingers, the grasping force is significantly minimized during use. The invention further provides the handheld controller with the most grasping comfort.

DETAILED DESCRIPTION OF THE PREFERRED EMBODIMENT

Figure 1:
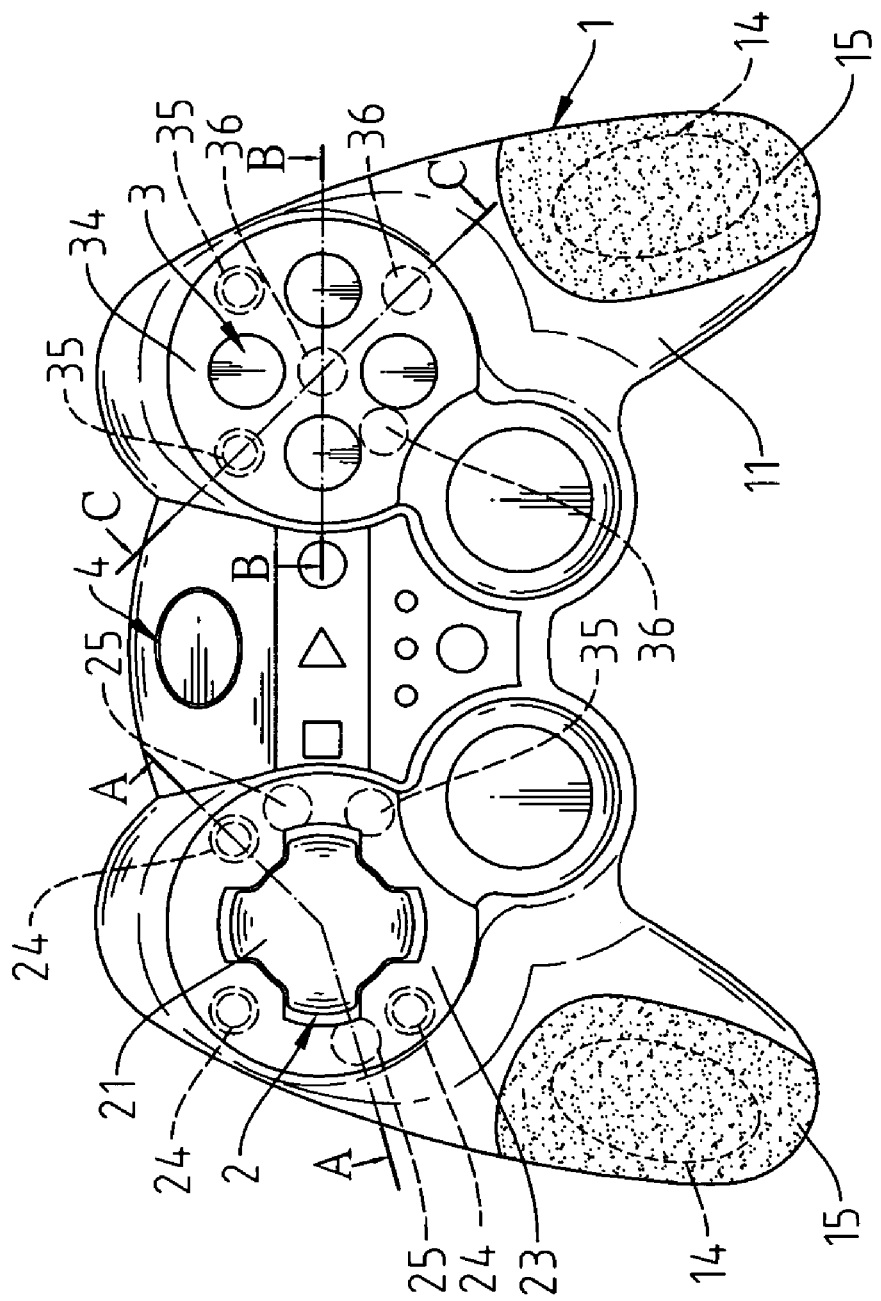
FIG. 1 is the illustration of appearance of the present invention.

Please refer to FIG. 1 for that the buffering protective handheld controller in the present invention is mainly to install direction buttons 2 and a number of functional buttons 3 on the handheld main unit 1.

Figure 2:
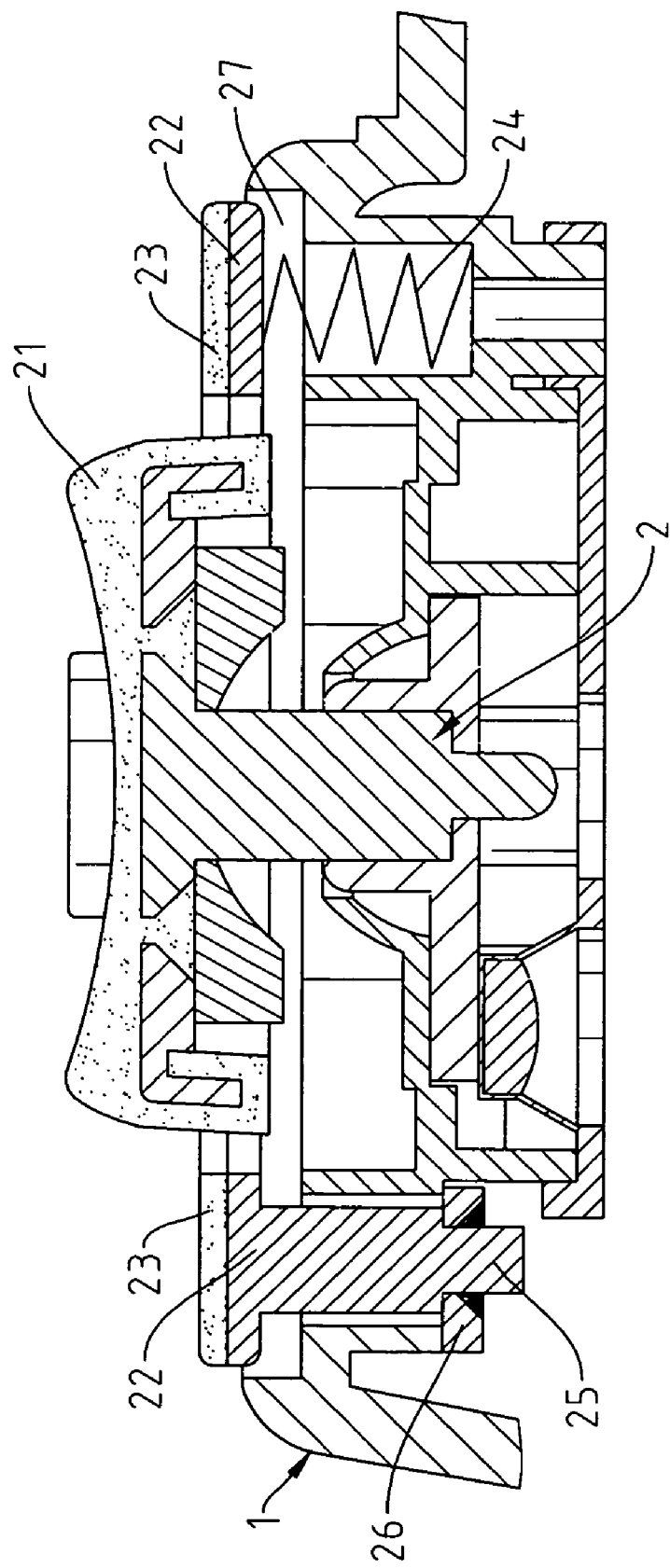
FIG. 2 is the A—A cross-sectional view for the present invention.

As shown in FIG. 2, the directional buttons 2 are on one side of the main unit 1 and the surface of the directional buttons 2 is covered by an elastic ring 22, which surface is covered by a layer of soft protective pad 23. Further, the bottom of the elastic ring 22 is held by a number of buffering devices 24. The buffering devices 24 can be flexible rubber, spring . . . etc. to reduce holding pressure. And there could be a number of molded axles 25 at the bottom of the elastic ring 22. The axles 25 connect at bottom with an elastic pad 26. Thus, the elastic ring 22 is allowed to move around the top of a slot 27 and avoids jumping off the main unit 1.

When the user presses the directional button 2 for direction control, the user can acquire better comfortability by direct hand pressing on the protective pad 21 that covers the directional buttons 2. Especially, before the user's hand presses the directional buttons 2 to the bottom, it feels the touch on the protective pad 23 on the elastic ring 22 around the directional buttons 2. This not only provides a greater touch area but also pressure reduction by a multiple sets of buffering devices 24 at the bottom of the elastic ring 22 and cushion action on a number of axles 25 and washers 26. In this way, the user is under a multiple protection from top to bottom, which includes the protective pad 21 on top of the directional button 2, the elastic ring 22 moving around in the middle to reduce pressure, and bottom cushion composed of buffering devices 24, axles 25 and washers 26. Such a handheld controller not only has the most comfortability but also reduced holding pressure. Furthermore, the invention can provide fatigue reduction, blistering prevention and benefits like finger protection from callus and deformation.

Figure 3:
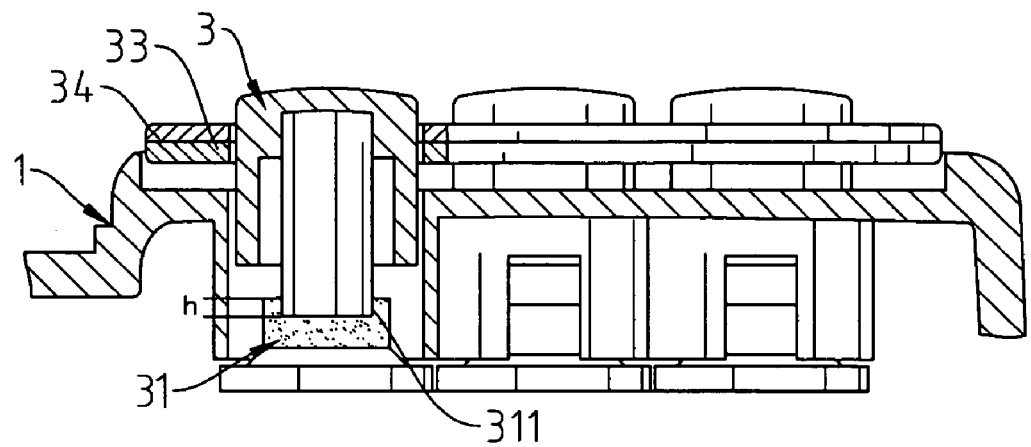
FIG. 3 is the B—B cross-sectional view for the present invention.
Figure 4:
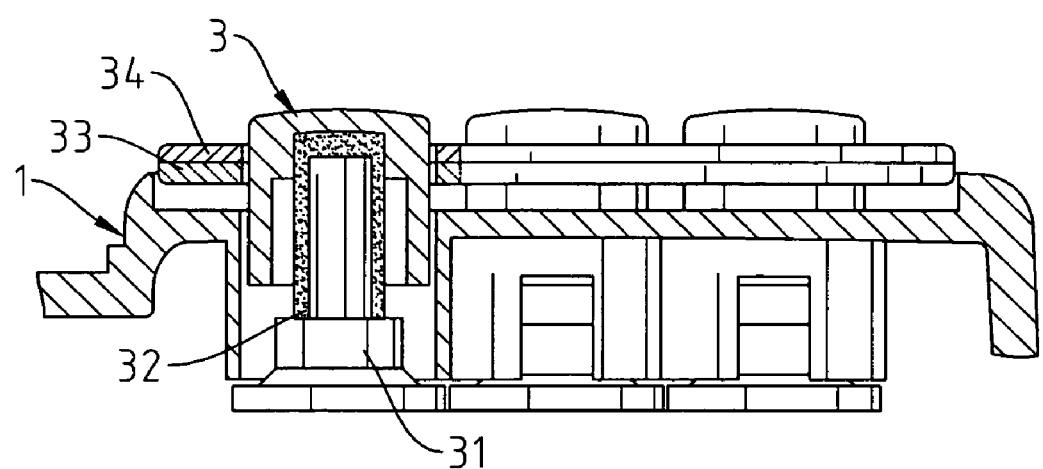
FIG. 4 is the cross-sectional view for another buffering module for the function button in the present invention.
Figure 5:
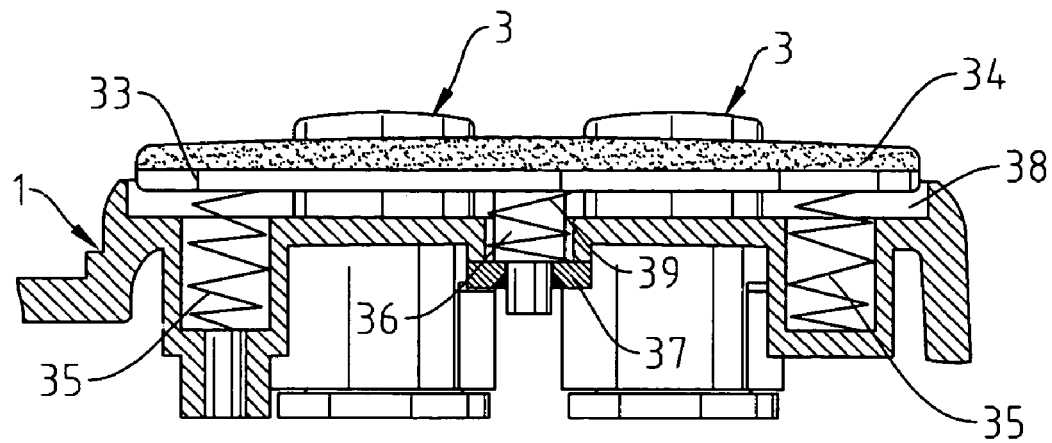
FIG. 5 is the C—C cross-sectional view for the present invention.
Figure 6:
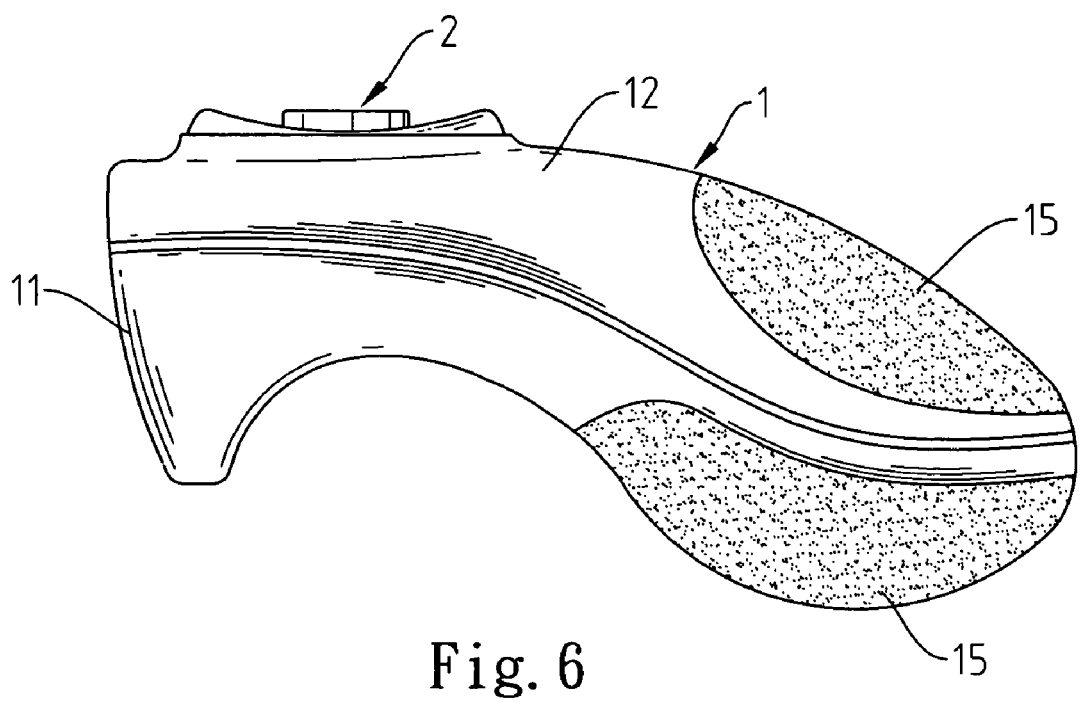
FIG. 6 is the side view of the main unit.
Figure 7:
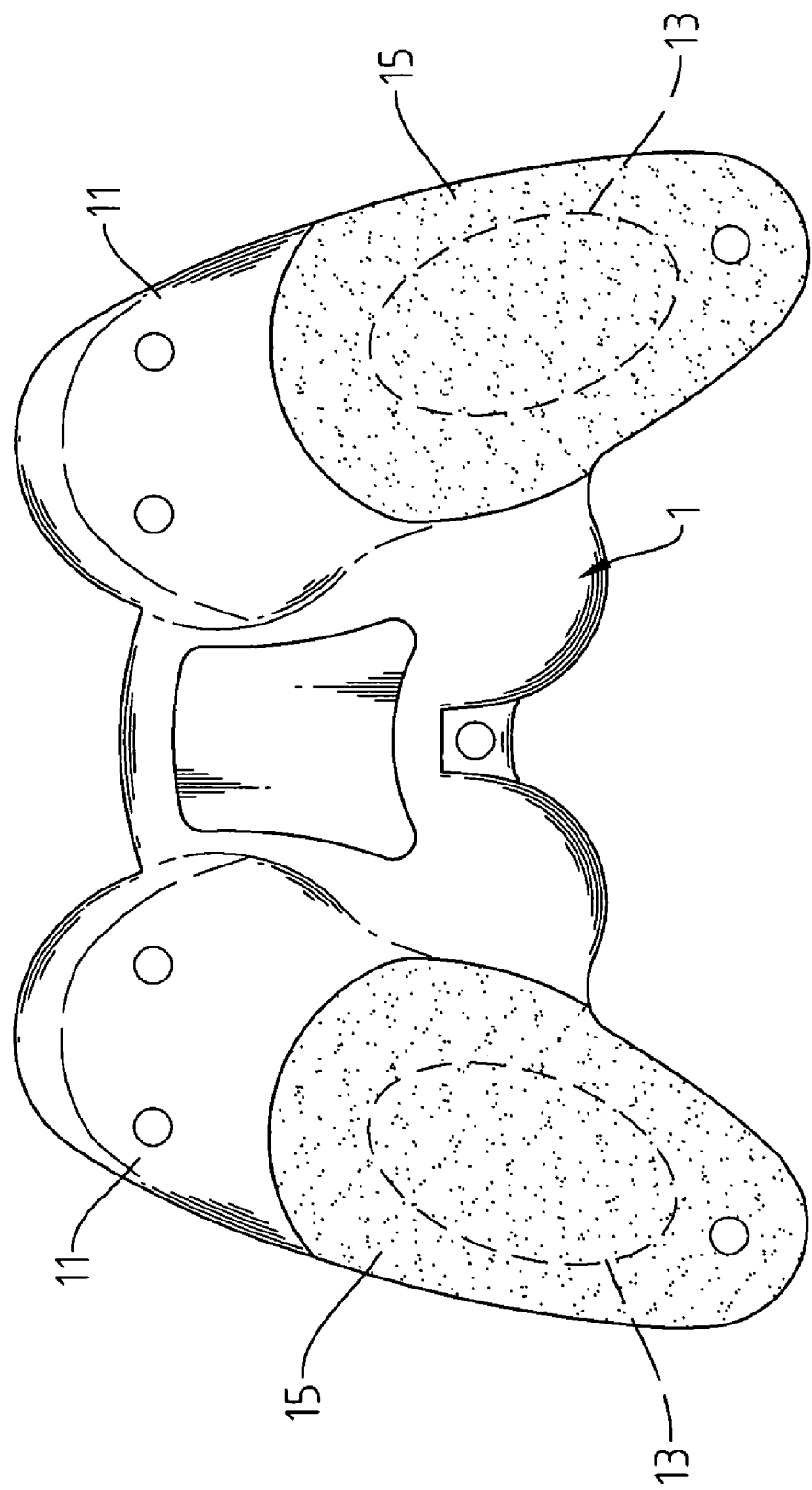
FIG. 7 is the top view of the main unit.
Figure 8:
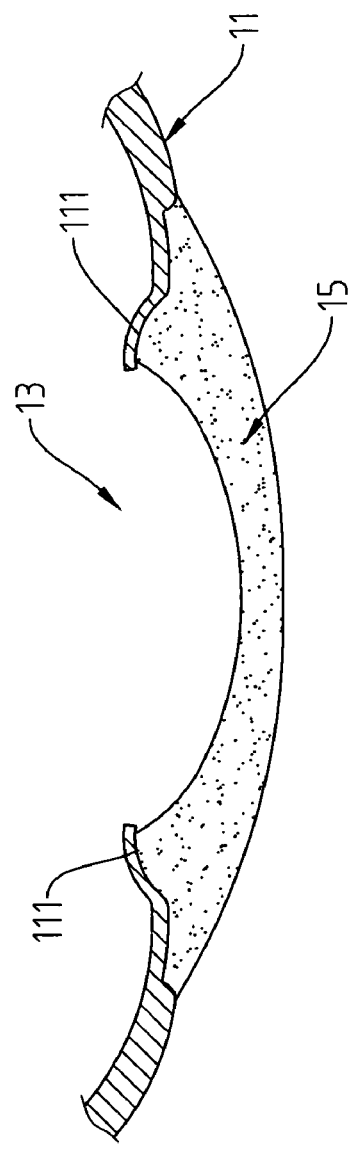
FIG. 8 is the partial cross-sectional view for the bottom in the present invention.
Figure 9:
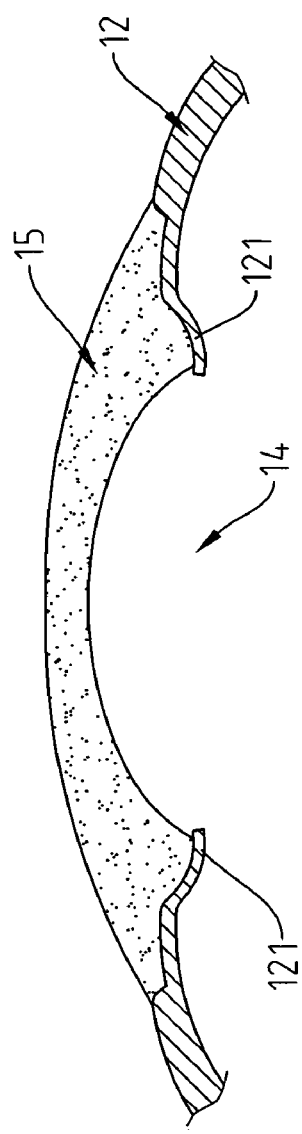
FIG. 9 is the partial cross-sectional view for the top cover in the present invention.

As shown in FIG. 3 and FIG. 4, the multiple number of functional buttons 3 are installed on the other side of the main unit 1. Its bottom where to press has a buffering device, which can be an elastic silicone bushing 31 (as shown in FIG. 3). On the top of the bushing 31, a through-hole 311 of a height h is to incorporate the functional button 3. By increasing the through-hole height, we can increase the pressure reduction for the functional button 3. Or the buffering device can be a hollow silicone elastic pin 32 (as shown in FIG. 4), which connects to the bottom of functional buttons 3 against the bushing 31. The elastic pin 32 enhances the pressure reduction for the functional buttons 3. On the other hand, as shown in FIG. 5, around the functional buttons 3, there are elastic rings 33 that surface is covered by soft protective pad 34. The elastic ring 33 is held by a multiple number of buffering devices 35, which can be soft rubber, spring . . . etc. to alleviate the pressure (spring in the Figure). A multiple sets of molded axles 36 at the bottom of the elastic ring 33 all connect to a elastic washer 37 and are covered by a spring 39, so the elastic ring 33 can float around the top of the slot 38 and avoid jumping off the main unit 1.

When the user presses the functional button 3, the buffering device at the bottom of the functional button 3 can provide comfort operability by reducing the pressure on user's hands. Besides, when the user's hand presses the functional button 3 to the bottom, the touch action is on the protective pad 34 of the top of the elastic ring 33 around the functional button 3. It not only enlarges the touch area but also reduces pressure by the multiple number of buffering devices 35 at the bottom of the elastic ring 33 and the pressure reduction mechanism through a number of axles 36 and washers 37. In this way, the user is under a multiple protection from top to bottom, which includes the buffering device at the bottom of the functional button 3, the elastic ring 33 moving around in the middle to reduce pressure, and bottom cushion composed of buffering devices 35, axles 36 and washers 37. The invention that reduces the button holding pressure can provide fatigue reduction, blistering prevention and benefits like finger protection from callus and deformation.

As shown in FIG. 1 and from FIG. 6 to FIG. 9, the main unit 1 has a special design of empty holes 13, 14 on the base 11 and the rigid plastic handle of the top cover 12. The peripheral of the holes 13, 14 appear as sticking edges 111, 121. Outside the holes 13, 14, there is a soft pad 15 fitting the handle (as in FIG. 8 and FIG. 9). This soft pad 15 placed into the holes 13, 14 can provide an arch effect. So under no pressure, the middle sticks out and does not sink. While under pressure the soft pad 15 has both sides against the sticking edges 111, 121, so its middle sinks gradually to provide buffering effect. This fits any hand shape of the operator. So effective grasp by the operator is achieved with reduced grasping force. It also provides a buffering effect and a comfortable feeling.

To summarize on the above description, the buffering protective handheld controller provided in the present invention is mainly an unit with a buffering protective configuration for direction buttons and a number of functional buttons on one side of the main unit. Thus, the user is allowed to have greater touch area and more comfortability when pressing the button. In addition, under a long period of button-pressing time, the user has finger contact with surrounding buffering devices to reduce pressure. Further, the handheld main unit has the rigid plastic base in an appropriate hollow shape, which may be enclosed by a sticking soft pad with a proper size. Thus, it can provide a cushion air-bag function and fits the user's palm in any shape and any size. Particularly, because the user can hold the unit with a firm grasp by fingers, the grasping force is minimized during use. Such a handheld controller not only has the most comfortability but also reduced holding pressure. Therefore, the invention can provide fatigue reduction, blistering prevention and benefits like finger protection from callus and deformation. This invention is considered to have great industrial applicability and progressiveness.

The invention claimed is:

1. A buffering protective handheld controller comprising: a main unit having a direction button and a plurality of functional buttons on one side thereof, a surface of the direction being covered by a first soft protective pad and surrounded by a first elastic ring covered by the first soft protective pad, a bottom of the first elastic ring being positioned by a plurality of first buffering devices, a plurality of first molded axles at a bottom of the first elastic ring being connected to an elastic pad, and the first elastic ring floating around a top of a first slot;

each of the plurality of functional buttons having a buffering device located on a bottom thereof and a second elastic ring located around an outer periphery thereof, the second elastic ring having a top surface covered by a second soft protective pad and positioned by a plurality of second buffering devices located on bottom thereof, a second molded axle located on bottom of each of the plurality of functional buttons being connected to an elastic washer, and the second elastic ring being limited to float around a top of a second slot;

an empty hole formed on a rigid plastic handle of a base and a top cover of the main unit, a peripheral of the empty hole appearing as a sticking edge, outside the empty hole having a soft pad fitting the handle, the soft pad placed into the hole providing an arch effect so under no pressure, a middle of the soft pad sticking out and does not sink, while under pressure the soft pad has both sides against the sticking edge, thus the middle sinks gradually to provide buffering effect;

when a user presses the buttons, the user can hold the soft pads on the main unit with a firm grasp by fingers and grasping force is minimized during use; when the user's hand presses the bottoms to the bottom, touch action is on the soft protective elastic rings around the buttons; such that not only a greater touch area but also pressure reduction by the buffering device and cushion action on the axles and washers are provided.

2. The buffering protective controller according to claim 1, wherein the buffering device located at the bottom of each of the plurality of functional buttons is an elastic silicone bushing with a hole at a predetermined height on a top thereof, one of the plurality of functional buttons is inserted into each hole.

3. The buffering protective controller according to claim 2, wherein each of the plurality of functional buttons is connected to the elastic silicone bushing by a hollow elastic silicone pin.

4. The buffering protective controller according to claim 1, wherein each of the plurality of first buffering devices and the plurality of second buffering devices is selected from a group consisting of a soft rubber and a spring.

* * * * *